(12) United States Patent
Yoshida et al.

(10) Patent No.: US 7,285,041 B2
(45) Date of Patent: Oct. 23, 2007

(54) AIR PASSAGE SWITCHING DEVICE AND VEHICLE AIR CONDITIONER

(75) Inventors: Takahiro Yoshida, Niwa-gun (JP); Takashi Yamamoto, Okazaki (JP)

(73) Assignee: DENSO Corporation, Kariya (JP)

( * ) Notice: Subject to any disclaimer, the term of this patent is extended or adjusted under 35 U.S.C. 154(b) by 143 days.

(21) Appl. No.: 11/301,082

(22) Filed: Dec. 12, 2005

(65) Prior Publication Data

US 2006/0130406 A1 Jun. 22, 2006

(30) Foreign Application Priority Data

Dec. 16, 2004 (JP) ............................. 2004-364994

(51) Int. Cl.
B60H 1/26 (2006.01)
(52) U.S. Cl. ....................... 454/143; 454/126
(58) Field of Classification Search ............... 454/121, 454/126, 143; 165/41, 42
See application file for complete search history.

(56) References Cited

U.S. PATENT DOCUMENTS

| | | | | |
|---|---|---|---|---|
| 3,521,653 A | * | 7/1970 | Zoya et al. ................ 137/831 |
| 4,531,671 A | * | 7/1985 | Schwenk ............... 237/12.3 B |
| 4,773,310 A | * | 9/1988 | Corwin ...................... 454/244 |
| 5,326,315 A | * | 7/1994 | Inoue et al. ............... 454/126 |
| 5,653,630 A | * | 8/1997 | Higashihara ............... 454/121 |
| 5,701,949 A | | 12/1997 | Yamaguchi et al. |
| 5,885,152 A | * | 3/1999 | Wardlaw .................... 454/121 |
| 5,901,943 A | * | 5/1999 | Tsunoda .................... 251/294 |
| 5,964,658 A | * | 10/1999 | Aizawa ...................... 454/156 |
| 6,045,444 A | * | 4/2000 | Zima et al. ................ 454/121 |
| 6,092,592 A | * | 7/2000 | Toyoshima et al. ......... 165/204 |
| 6,293,339 B1 | * | 9/2001 | Uemura et al. ............ 165/203 |
| 6,296,562 B1 | * | 10/2001 | Uemura et al. ............ 454/121 |
| 6,308,770 B1 | * | 10/2001 | Shikata et al. ............... 165/42 |
| 6,382,518 B1 | * | 5/2002 | Shibata et al. ......... 237/12.3 B |
| 6,398,638 B1 | * | 6/2002 | Shibata et al. ............... 454/69 |
| 6,508,703 B1 | * | 1/2003 | Uemura et al. ............ 454/156 |
| 6,926,068 B2 | * | 8/2005 | Ito et al. ...................... 165/43 |
| 6,926,253 B2 | * | 8/2005 | Tokunaga et al. .......... 251/368 |
| 6,932,692 B1 | * | 8/2005 | Lin ............................ 454/69 |

FOREIGN PATENT DOCUMENTS

| | | |
|---|---|---|
| EP | 1 070 611 | 1/2001 |
| JP | 08-072525 | 3/1996 |
| JP | 11-020453 | 1/1999 |
| JP | 2000-038014 | 2/2000 |

* cited by examiner

*Primary Examiner*—Derek S. Boles
(74) *Attorney, Agent, or Firm*—Harness, Dickey & Pierce, PLC (57) ABSTRACT

An air passage switching device includes a slide door slidable along first and second opening portions partitioned by a partition portion, a guide member for guiding the slide door, and a link mechanism for slidably moving the slide door along the guide member. The link mechanism includes a rotation shaft rotatably supported in a case, a link portion provided at one end portion of the slide door, and a link lever connected to the rotation shaft and the link portion. The link portion is rotatable around the rotation shaft only within a range of the second opening portion in a sliding direction, among the first and second opening portions. Furthermore, the slide door can be provided with a first seal portion for sealing a clearance with outer peripheral portions of the first and second opening portions, and a second seal portion for sealing a clearance with the partition portion.

15 Claims, 8 Drawing Sheets

AIR PASSAGE SWITCHING DEVICE AND VEHICLE AIR CONDITIONER

CROSS REFERENCE TO RELATED APPLICATION

This application is based on Japanese Patent Application No. 2004-364994 filed on Dec. 16, 2004, the contents of which are incorporated herein by reference in its entirety.

FIELD OF THE INVENTION

The present invention relates to an air passage switching device and a vehicle air conditioner using the same. More particularly, the present invention relates to an air passage switching device in which a slide door having a plate shape is slid by a rotation of a link lever to switch an air passage.

BACKGROUND OF THE INVENTION

Figure 8:
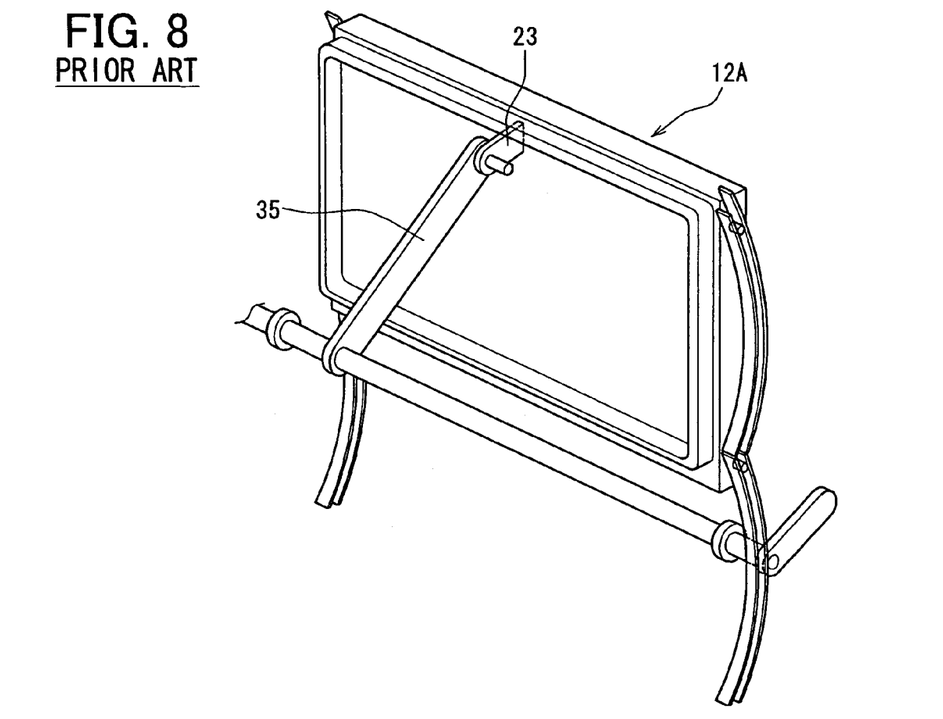
FIG. 8 is a perspective view showing a conventional slide door.
Figure 9:
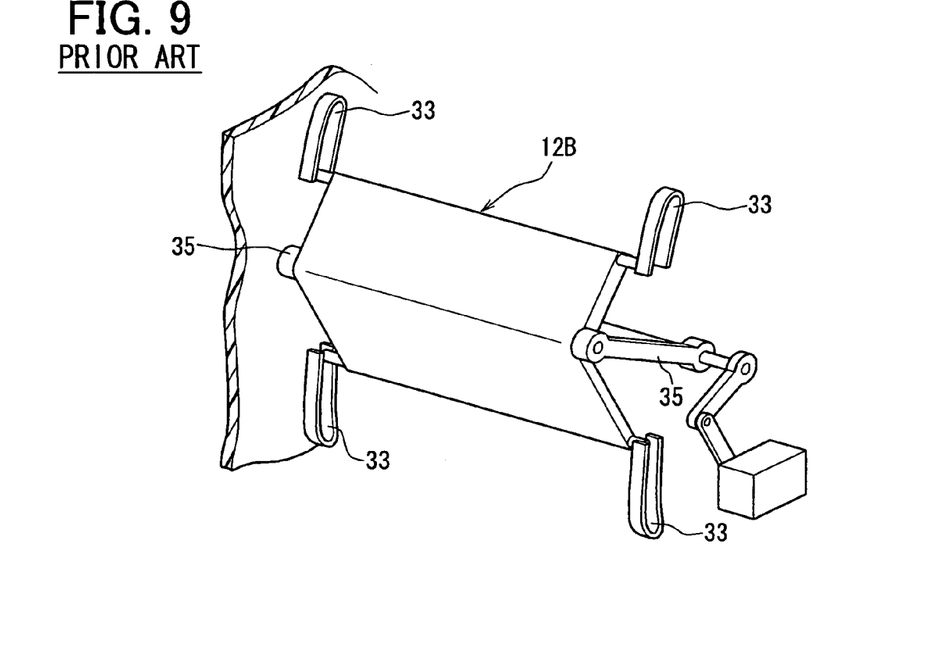
FIG. 9 is a perspective view showing another conventional slide door.

An air conditioner having a slide door is described in JP-A-8-290714 (corresponding to U.S. Pat. No. 5,701,949) and JP-A-11-20453, for example. FIG. 8 is a perspective view showing a slide door 12A in JP-A-8-290714, and FIG. 9 is a perspective view showing a slide door 12B in JP-A-11-20453. However, in both the slide doors, when one passage opening portion is closed by the slide door 12A or 12B, a sealing may be not completely performed.

Figure 10A:
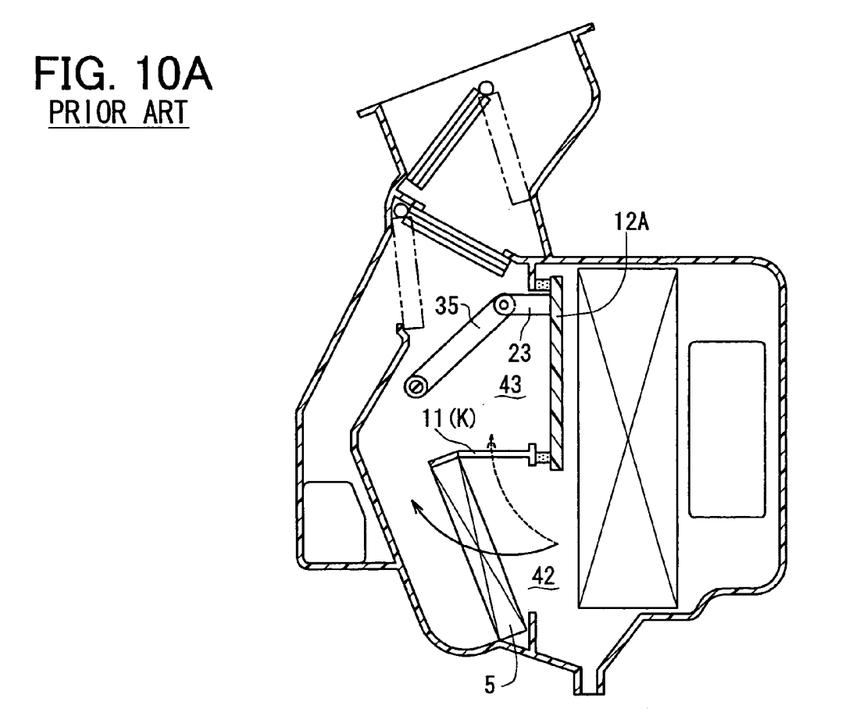
FIG. 10A is a schematic sectional view showing a vehicle air conditioner using the slide door of FIG. 8 in a maximum hot state.

FIG. 10A shows an air conditioner using the slide door 12A in FIG. 8 when a maximum hot state is set. During the maximum hot state, a first passage opening portion 42 communicating with a heater core 5 is fully opened, and a second passage opening portion 43 through which air bypasses the heater core 5 is closed. In this state, a link portion 23 for connecting the slide door 12 and a link lever 35 is positioned in the second passage opening portion 43.

Figure 10B:
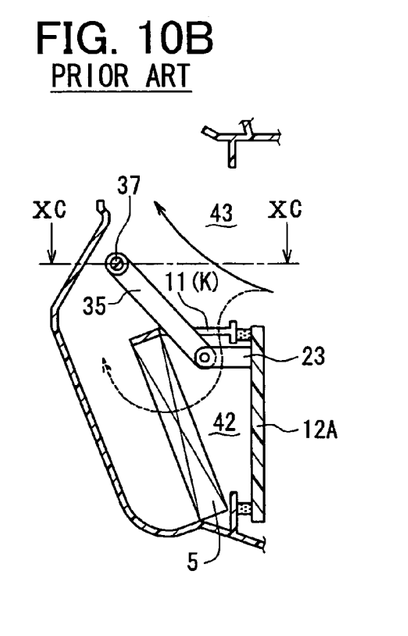
FIG. 10B is a sectional view showing a part of the vehicle air conditioner of FIG. 10A in a maximum cold state.
Figure 10C:
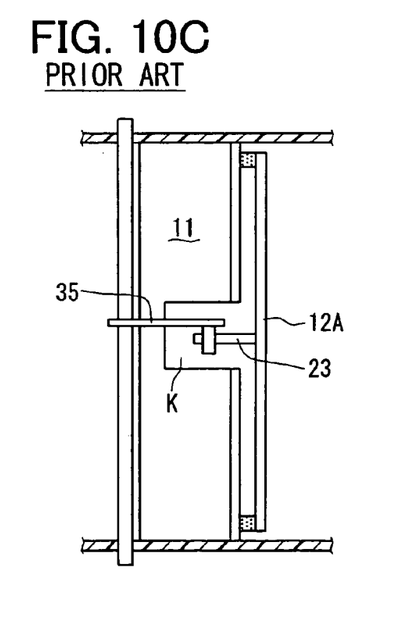
FIG. 10C is a cross-sectional view taken along the line XC-XC in FIG. 10B.

Furthermore, in a maximum cold state shown in FIG. 10B, the slide door 12 fully opens the second passage opening portion 43 and fully closes the first passage opening portion 42. In this state, the link portion 23 for connecting the slide door 12 and the link lever 35 passes a partition portion 11 between both the first and second passage opening portions 42, 43, and is moved into the first passage opening portion 42. That is, as shown in FIG. 10C, in order to set both the maximum hot state and the maximum cold state shown in FIGS. 10A and 10B, it is necessary to provide a recess portion K for passing the link portion and a rotation tip portion of the link lever 35.

Accordingly, in the maximum hot state shown in FIG. 10A, the second passage opening portion 43 is not completely closed, and a part of air to pass through the heater core 5 in the first passage opening portion 42 leaks from the first passage opening portion 42 toward the second passage opening portion 43 through the recess portion K in the partition portion 11. Similarly, in the maximum cold state shown in FIG. 10B, the first passage opening portion 42 is not completely closed, and a part of air to pass through the second passage opening portion 43 leaks toward the first passage opening portion 42 on the side of the heater core 5 through the recess portion K of the partition portion 11.

By contrast, in the slide door 12B shown in FIG. 9, an air leakage may be caused through cut portions of guide grooves 33 for rotating link levers 35 on two sides of the slide door 12B, similarly to the recess portion K.

SUMMARY OF THE INVENTION

In view of the above-described problems, it is an object of the present invention to provide an air passage switching device which can completely seal a sealing portion when one of first and second opening portions is closed. The air passage switching device can be suitably used for a vehicle air conditioner.

According to an aspect of the present invention, an air passage switching device includes a case for defining an air passage having adjacent first and second opening portions partitioned from each other by a partition portion, a slide door slidable along the first and second opening portions in a sliding direction, a guide member provided in the case for guiding the slide door to be slidable, and a link mechanism for slidably moving the slide door along the guide member. In the air passage switching device, the link mechanism includes a rotation shaft rotatably supported in the case, a link-portion provided at one end portion of the slide door in the slide direction, and a link lever connected to the rotation shaft and the link portion. Furthermore, the link portion is positioned at a tip end portion of the link lever, and is rotatable around the rotation shaft only within a range of the second opening portion in the sliding direction, among the first and second opening portions. Therefore, it is unnecessary to provide a recess portion in the partition portion for passing the link portion and a rotation tip side of the connection lever.

In addition, the slide door is provided with a first seal portion for sealing a clearance with outer peripheral portions of the first and second opening portions, and a second seal portion for sealing a clearance with the partition portion. Therefore, when any one of the first and second passage opening portions is closed, the one of the first and second passage opening portions can be completely sealed using the first and second seal portions of the slide door.

For example, the link portion can be connected to the slide door at least at one position inside the first seal portion in the sliding direction.

Furthermore, the link portion can be provided at a first end position of the slide door, close to the second opening portion when the slide door fully closes the first opening portion. In this case, a guide pin is provided at a second end portion far from the second opening portion when the slide door fully closes the first opening portion, and only the guide pin is engaged with the guide member to be slidable relative to the guide member. Therefore, the sealing structure of the air passage switching device can be readily formed with a simple structure.

The first opening portion and the second opening portion can be arranged on surfaces bent at the partition portion. In this case, the partition portion is bent to correspond to the bent surfaces, the guide member is arranged only in a range corresponding to the first opening portion in the sliding direction, and the first end portion of the slide door is bent to correspond to the bent partition portion. Therefore, the air passage switching device can be easily mounted in a limited small space.

Further, the guide member can be provided, such that a press-contacting force of the first and second seal portions of the slide door to the outer peripheral portion of the first and second opening portions and the partition portion is larger when the slide door fully closes one of the first and second opening portions, as compared with a case where both the first and second opening portions are opened by the slide door. Therefore, the sealing performance of the slide door can be effectively improved while slide resistance and slide noise can be restricted.

The air passage switching device can be suitably used for an inside/outside air switching box of a vehicle air conditioner. In this case, the first opening portion can be used as an outside air introduction port for introducing air outside a passenger compartment into the case, the second opening portion can be used as an inside air introduction port for introducing air inside the passenger compartment into the case, and the partition portion can be bent to protrude upstream from the first and second opening portions in an air flow direction.

Alternatively, the air passage switching device can be used for an air mixing portion of a vehicle air conditioner, which includes a cooling unit disposed in the case for cooling air, and a heating unit disposed in the case downstream from the cooling unit for heating air. In this case, the first opening portion can be provided upstream from the heating unit to communicate with a warm air passage of the heating unit, the second opening portion can be provided upstream from the heating unit to communicate with a bypass passage through which air from the cooling unit bypasses the heating unit, and the partition portion can be bent to protrude downstream from the first and second opening portions in an air flowing direction.

BRIEF DESCRIPTION OF THE DRAWINGS

The above and other objects, features and advantages of the present invention will become more apparent from the following detailed description of preferred embodiments made with reference to the accompanying drawings, in which:

FIGS. 5A and 5B are schematic sectional views showing a part of an air passage switching device when the air passage switching device is used for an inside/outside air switching device for a vehicle air conditioner, according to a second embodiment of the present invention, in which FIG. 5A shows an inside air introducing mode and FIG. 5B shows an outside air introducing mode;

FIGS. 6A and 6B are schematic sectional views showing a part of an air passage switching device when the air passage switching device is used for an air mixing portion for a vehicle air conditioner, according to a third embodiment of the present invention, in which FIG. 6A shows a maximum cold state and FIG. 6B shows a maximum hot state;

DETAILED DESCRIPTION OF PREFERRED EMBODIMENTS

Embodiments of the present invention will be now described with reference to the drawings.

First Embodiment

Figure 1A:
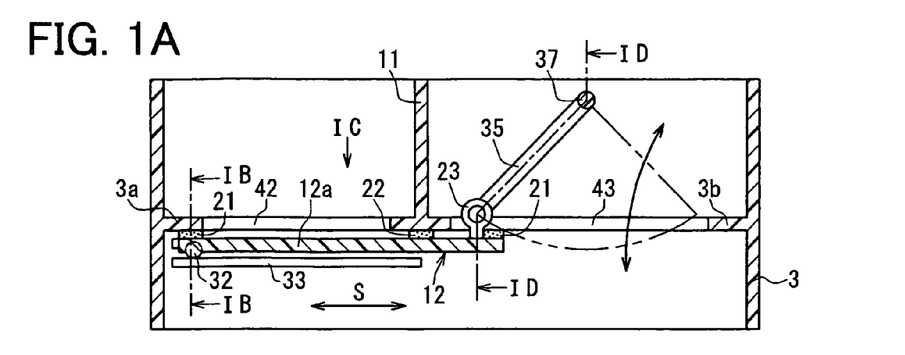
FIG. 1A is a schematic sectional view showing an air passage switching device having first and second passage opening portions when a first passage opening portion is closed according to a first embodiment of the present invention.
Figure 1B:
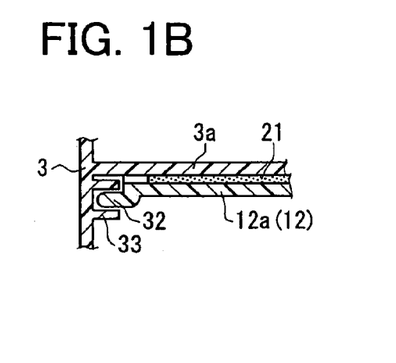
FIG. 1B is a cross-sectional view taken along the line IB-IB in FIG. 1A.
Figure 1C:
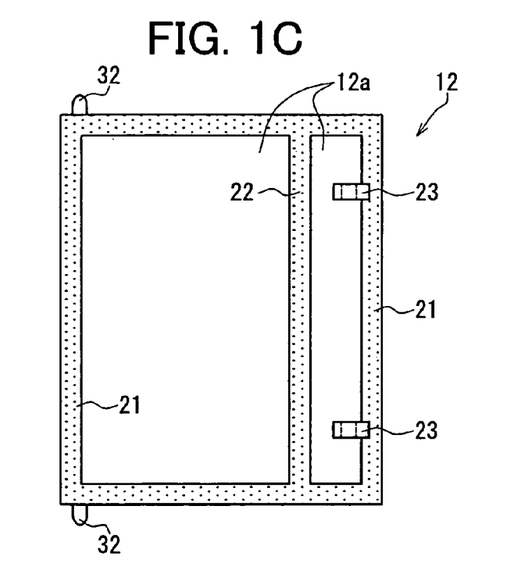
FIG. 1C is a view when being viewed from the arrow IC in FIG. 1A.
Figure 1D:
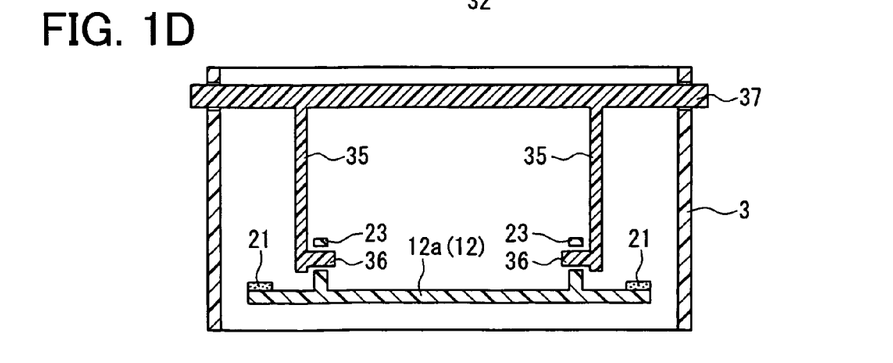
FIG. 1D is a cross-sectional view taken along the line ID-ID in FIG. 1A.

FIG. 1A is a schematic sectional view showing an air passage switching device having first and second passage opening portions 42, 43 when the first passage opening portion 42 is closed according to the first embodiment. FIG. 1B is a cross-sectional view taken along the line IB-IB in FIG. 1A, FIG. 1C is a view when being viewed from the arrow IC in FIG. 1A, and FIG. 1D is a cross-sectional view taken along the line ID-ID in FIG. 1A.

A case 3 made of resin is provided to form an air passage including the first and second passage opening portions 42, 43. The first and second passage opening portions 42, 43 are formed in the case 3 adjacent to each other, and are partitioned from each other by a partition portion 11. The partition portion 11 can be arranged in the case 3 to partition the air passage into a first passage communicating with the first passage opening portion 42 and a second passage communicating with the second passage opening portion 43.

Figure 2A:
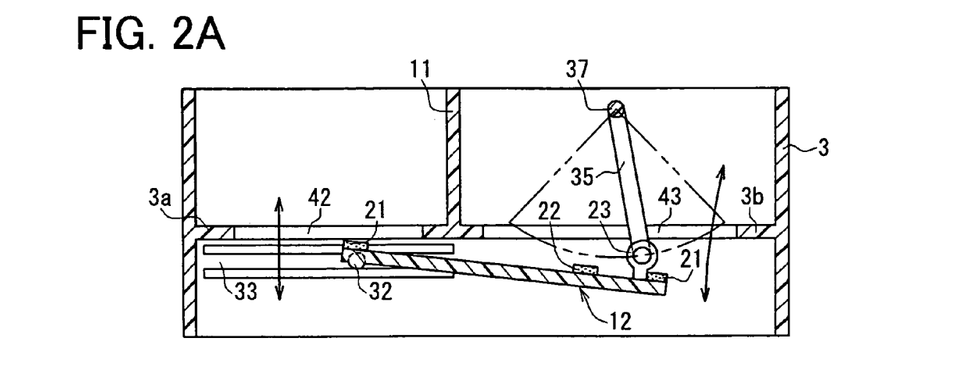
FIG. 2A is a schematic sectional view showing a state where both the first and second passage opening portions are opened.
Figure 2B:
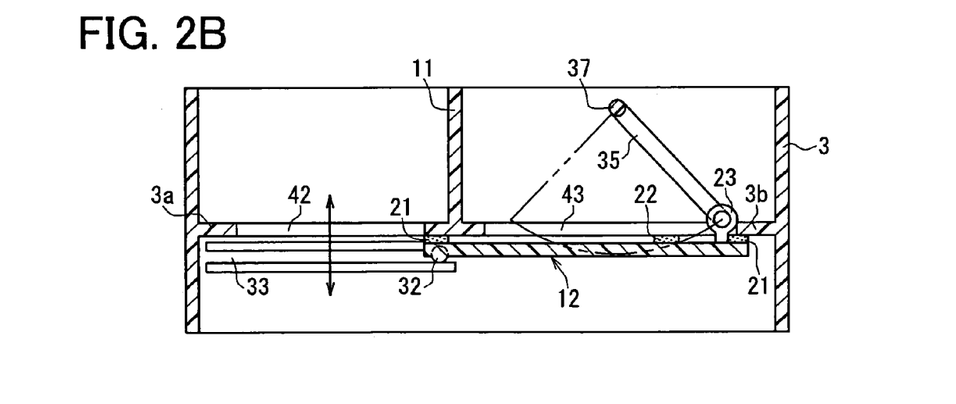
FIG. 2B is a schematic sectional view when the second passage opening portion is closed.

A slide door 12 is located to open and close the first and second passage opening portions 42, 43 of the first and second passages. The slide door 12 is sladable in a sliding direction S that is approximately perpendicular to a flow direction of air flowing through the first and second passage opening portions 42, 43. In this embodiment, a guide groove portion 33 is formed in the case 3 at two sides of each passage opening portion 42, 43, to guide the slide door 12 in the sliding direction S, as shown in FIGS. 1 and 2.

The slide door 12 has a door body 12a made of resin. A link portion 23 is provided at a first end portion of the door body 12a in the sliding direction S to be connected with a link mechanism. As shown in FIGS. 1A and 1B, a guide pin 32 is formed in the door body 12a of the slide door 12 to be slidable in the guide groove portion 33 and to support a second end portion of the slide door 12 in the sliding direction S. For example, in this embodiment, the guide pin 32 is provided only at the second end portion of the slide door 12, opposite to the link portion 23 in the sliding direction S.

An outer peripheral seal portion 21 is provided on an outer peripheral portion of the slide door 12 to seal a clearance between the slide door 12 and an outer peripheral portion 3a, 3b of the first or second passage opening portion 42, 43 in the case 3 when the first or second passage opening portion 42, 43 is closed. Furthermore, as shown in FIG. 1C, an intermediate seal portion 22 is provided on the slide door 12 inside the outer peripheral seal portion 21 to seal a clearance with the partition portion 11 when one of the first and second passage opening portions 42, 43 is closed. The outer peripheral seal portion 21 and the intermediate seal portion 22 are made of an elastic material such as urethane foam or an elastomeric resin.

A rotation shaft 37 is provided in the case 3, and a link lever 35 is provided to protrude from the rotation shaft 37. A tip end portion of the link lever 35 is connected to the link portion 23 of the slide door 12 by using an engagement pin 36, so as to construct a link mechanism for sliding the slide door 12 in the sliding direction S.

FIG. 2A is a schematic sectional view showing a state where both the first and second passage opening portions 42, 43 are opened, and FIG. 2B is a schematic sectional view when the second passage opening portion 43 is closed. By rotating the rotation shaft 37, the slide door 12 moves and slides in the sliding direction S to open and close the first and second passage opening portions 42, 43. In this embodiment, even when the slide door 12 slides to open and close the first and second passage opening portions 42, 43, the link portion 23 is always positioned in one of the first and second passage opening portions 42, 43. For example, in the example shown in FIGS. 2A and 2B, the link lever 35 is always rotated on the side of the second passage opening portion 43 so that the link portion 23 is always positioned in a range corresponding to the second passage opening portion 43 in the sliding direction S.

According to the first embodiment, the link portion 23 is positioned and rotated around the rotation shaft 37 only in a range corresponding to one of the first and second passage opening portions 42, 43. Furthermore, the intermediate seal portion 22 is provided on the surface of the slide door 12 to seal a clearance with the partition portion 11.

Because the link portion 23 is moved and rotated by the rotation shaft 37 and the link lever 35 only in the range corresponding to one of the first and second passage opening portions 42, 43, it is unnecessary to provide a recess portion in the partition portion 11 for passing the rotating end portion of the link lever 35 and the link portion 23. Furthermore, the intermediate seal portion 22 is provided to seal the clearance with the partition portion 11 when one of the first and second passage opening portions 42, 43 is closed. Accordingly, any one of the first and second passage opening portions 42, 43 is closed, the one of the first and second passage opening portions 42, 43 can be tightly sealed by using the outer peripheral seal portion 21 or using both the outer peripheral seal portion 21 and the intermediate seal portion 22.

The slide door 12 can be provided to be supported by the guide pin 32 that only engages with the guide groove portion 33. In this embodiment, the guide pin 32 is provided only at one end side of the slide door 12, opposite to the link portion 23 in the sliding direction S. It is compared with a case where two guide pins are provided at two end sides of the slide door 12 in the sliding direction S, the slide door 12 can slide smoothly in the slide direction S because the slide door 12 is controlled at two points of the link portion 23 and the guide pin 32.

In this embodiment, the link portion 23 is provided at the first end portion of the slide door 12, close to the second passage opening portion 43 when the slide door 12 fully closes the first passage opening portion 42. Furthermore, the guide pin 32 is provided at the other end portion of the slide door 12, far from the second passage opening portion 43 when the slide door 12 fully closes the first passage opening portion 42. Only the guide pin 32 can be engaged with the guide groove portion 33 to be slidable relative to the guide groove portion 33.

Because the guide pin 32 is only formed at the one end side of the slide door 12, the guide groove portion 33 is only necessary for an area corresponding to one of the passage opening portions 42, 43, where the guide pin 32 is moved. Therefore, it is unnecessary to provided a guide groove portion for an area corresponding to the other one of the passage opening portions 42, 43.

Figure 3A:
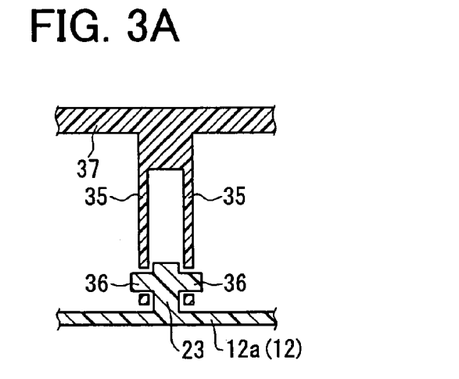
FIGS. 3A and 3B are sectionals views each of which shows a modification of the structure shown in FIG. 1D.
Figure 3B:
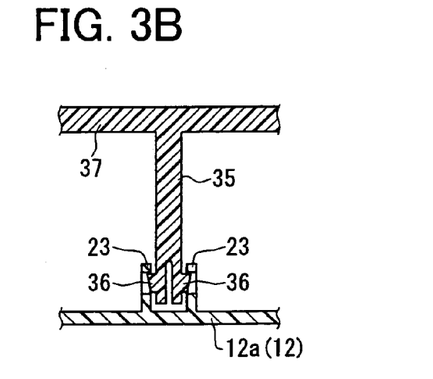

In the example shown in FIG. 1D, the link portion 23 is provided at two positions of the slide door 12 in an axial direction of the rotation shaft 37 to be connected to two link levers 35, respectively. However, the link portion 23 can be provided at a single position in the slide door 12, and the connection structure of the link mechanism can be suitably changed. FIGS. 3A and 3B are sectional views showing the other examples of the connection structure of the link mechanism. In the example shown in FIG. 3A, the link portion 23 is provided at a single position of the slide door 12 while being linked with two link levers 35. Furthermore, in the example shown in FIG. 3B, the link portion 23 is provided at a single position of the slide door 12 while being linked with one link lever 35.

In the air passage switching device of the first embodiment, a downstream air passage of the first passage opening portion 42 and a downstream air passage of the second passage opening portion 43 can be joined with each other, or can be partitioned from each other. Furthermore, the air passage switching device may be suitably used for switching an air passage of an air conditioner, for example.

Second Embodiment

Figure 4:
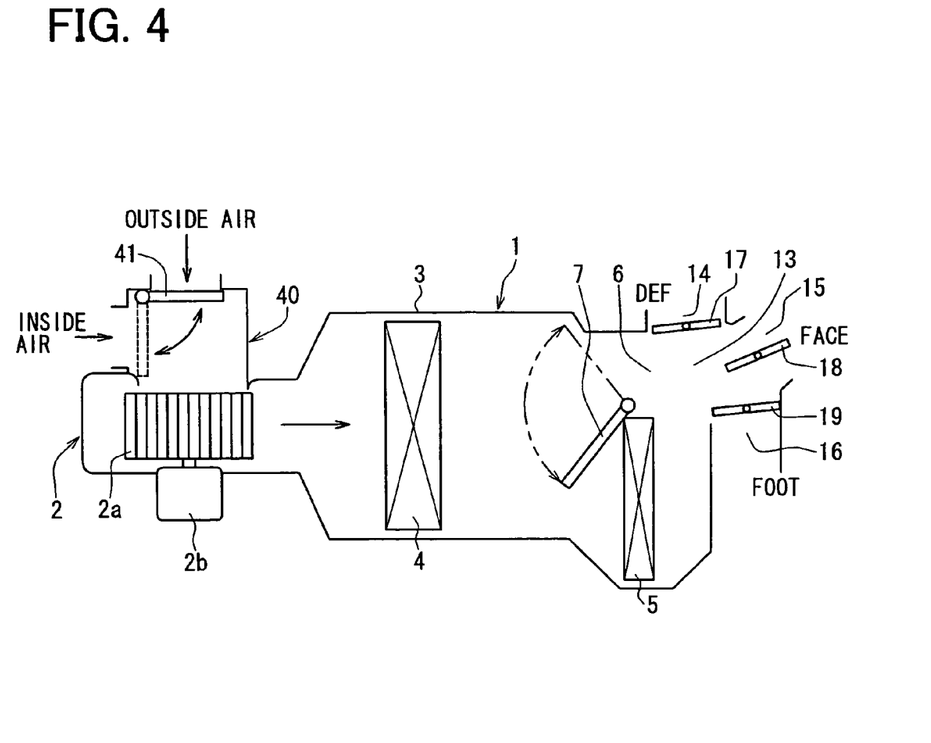
FIG. 4 is a schematic diagram showing a vehicle air conditioner in which the air passage switching device of the present invention can be used.

FIG. 4 is a schematic diagram showing a vehicle air conditioner having a blower unit 2 and an interior air conditioning unit 1. The interior air conditioning unit 1 can be mounted inside a dashboard on a front portion in a passenger compartment. In this embodiment, an air passage switching device is suitably used for the air conditioner.

Figure 5A:
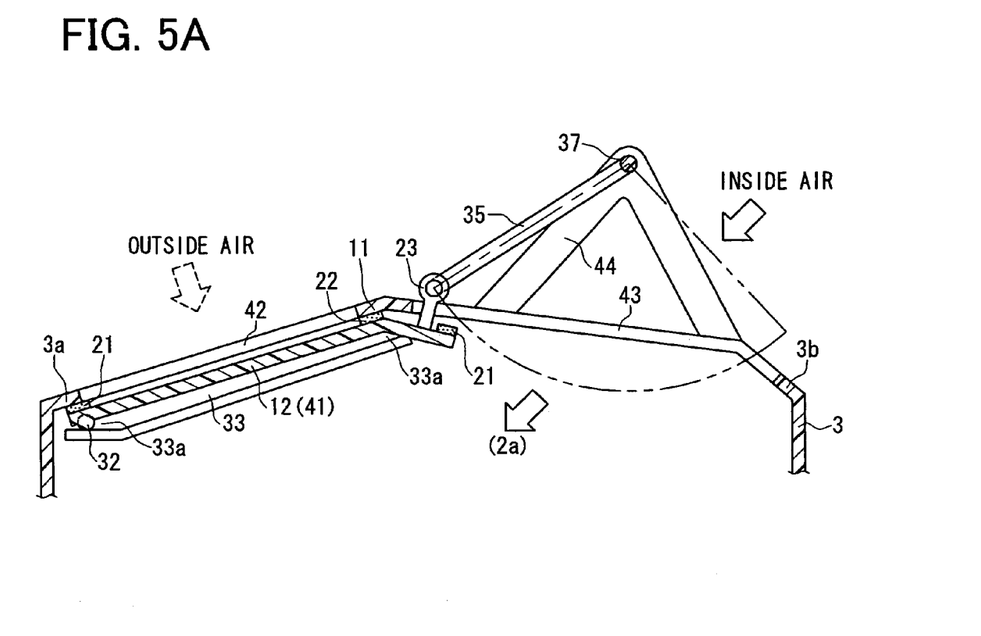
Figure 5B:
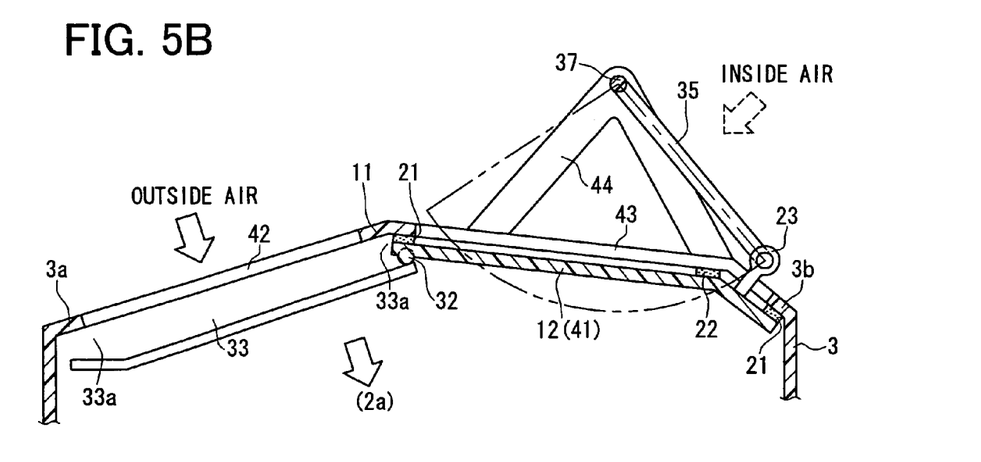

The interior air conditioning unit 1 includes a case 3 for defining an air passage through which air flows into the passenger compartment. An evaporator 4 is disposed in the case for cooling air blown from the blower unit 2. The blower unit 2 for blowing air into the passenger compartment through the air passage is disposed upstream from the evaporator 4 in an air flow direction. The blower unit 2 is disposed in the case 3, and includes a centrifugal blower fan 2a and a driving motor 2b for driving the centrifugal blower fan 2a. Furthermore, an inside/outside air switching box 40 is located at a suction side of the blower fan 2a. An inside/outside air switching door 41 is provided in the inside/outside air switching box 40 to open and close an outside air introduction port and an inside air introduction port. In this embodiment, a casing part of the inside/outside air switching box 40 is indicated by the case 3 in convenience, as shown in FIGS. 5A and 5B.

An air mixing door 7 is located in the case 3 at a downstream air side of the evaporator 4, and a heater core 5 for heating air using engine cooling water (i.e., hot water) as a heating source is located in the case 3 downstream from the evaporator 4. The heater core 5 is arranged in the case 3 to form a bypass passage 6 through which air bypasses the heater core 5. The air mixing door 7 is arranged to open and close an air passage of the heater core 5 and the bypass passage 6.

In the example shown in FIG. 4, a plate door is used as the air mixing door 7. The air mixing door 7 adjusts a ratio between an air amount passing through the heater core 5 and an air amount passing through the bypass passage 6, so that the temperature of air to be blown into the passenger compartment can be adjusted. That is, the air mixing door 7 is a temperature adjusting unit for adjusting temperature of air to be blown into the passenger compartment.

Warm air heated by the heater core 5 and cool air from the bypass passage 6 are mixed in an air mixing portion 13 so that conditioned air having a suitable temperature can be obtained. Furthermore, plural air outlets from which air is blown into the passenger compartment and a mode switching portion are provided at a downstream air side of the air mixing portion 13. For example, the plural air outlets includes a defroster opening portion 14, a face opening portion 15 and a foot opening portion 16, and the mode switching portion includes a defroster door 17, a face door 18 and a foot door 19.

Specifically, the defroster opening portion 14 is provided for blowing conditioned air to an inner surface of a windshield, the face opening portion 15 is provided for blowing conditioned air to an upper side of the passenger compartment, and the foot opening portion 16 is provided for blowing conditioned air to a lower side in the passenger compartment. The defroster door 17, the face door 18 and the foot door 19 are located to open and close the defroster opening portion 14, the face opening portion 15 and the foot opening portion 16, respectively.

In the second embodiment, an air passage switching device is typically used for the inside/outside air switching box 40. FIG. 5A shows an inside air introducing mode in which only inside air (i.e., air inside the passenger compartment) is introduced into the inside/outside air switching box 40 through the inside air introduction port. FIG. 5B shows an outside air introducing mode in which only outside air (i.e., air outside the passenger compartment) is introduced into the inside/outside air switching box 40 through the outside air introduction port. Accordingly, in this embodiment, a slide door 12 is used as the inside/outside air switching door 41, a first passage opening portion 42 is used as the outside air introducing port, and a second passage opening portion 43 is used as the inside air introducing port. In this embodiment shown in FIGS. 5A and 5B, the components similar to those of the above-described first embodiment are indicated by the same reference numbers, and detail explanation thereof is omitted.

A rotation shaft 37 for moving and sliding the slide door 12 is supported by a bracket 44 that is formed integrally with the case 3 at an outside of the inside air introduction port (i.e., second passage opening portion 43). Further, a link portion 23 linked to the slide door 12 is connected to the rotation shaft 37 through a link lever 35. Similarly to the above-described first embodiment, because the link portion 23 is moved by the rotation shaft 37 and the link lever 35, only in the range corresponding to one of the first and second passage opening portions 42, 43 in a sliding direction, it is unnecessary to provide a recess portion in the partition portion 11 for passing a rotating end portion of the link portion 23 and the link lever 35.

In the second embodiment, a seal surface of the case 3 at peripheral portions of the first and second passage opening portions 42, 43 is bent at a partition portion 11 between the first and second passage opening portions 42, 43 approximately in V shape. That is, the seal surface of the case 3 at the peripheral portions of the first and second passage opening portions 42, 43 is not positioned on the same plan. Accordingly, the air passage switching device can be easily mounted for the inside/outside air switching box 40 in a limited small space. Therefore, the layout of the air passage switching device can be improved.

Specifically, as shown in FIGS. 5A and 5B, a partition portion 11 for partitioning the first and second passage opening portions 42, 43 is arranged to protrude toward upstream in the air flow direction, so that the seal surface is formed into approximately in a V shape. Therefore, when the air passage switching device shown in FIGS. 5A and 5B is used for the inside/outside air switching box 40 for a vehicle air conditioner, an arrangement space of the inside/outside air switching box 40 can be effectively improved.

In this embodiment, the seal surfaces of the case 3 between the first and second passage opening portions 42, 43 is bent approximately in a V shape so that the partition portion 11 protrudes toward upstream. Furthermore, the partition portion 11 is also bent in accordance with the bent surfaces of the first and second passage opening portions 42, 43. Therefore, the first passage opening portion 42 used as the outside air introduction port can be set at a suitable angle position to be easily connected with an end portion of an outside air introduction duct on a vehicle side. Furthermore, the second passage opening portion 43 used as the inside air introduction port can be set at a suitable angle position so that the inside air of the passenger compartment can be easily drawn.

The slide door 12 is bent to be slidable along a seal surface of the partition portion 11. Furthermore, the slide door 12 is provided with seal portions 21, 22 for sealing when the first passage opening portion 42 or the second passage opening portion 43 is fully closed, similarly to the above-described first embodiment.

A guide groove portion 33 is formed such that a press-contacting force of the seal portions 21, 22 of the slide door 12 relative to the seal surfaces of outer peripheral portions 3a, 3b and the partition portion 11 of the first and second passage opening portions 42, 43 is made larger when the slide door 12 closes one of the first and second passage opening portions 42, 43, as compared with a case where the slide door 12 is positioned at a position between the first and second passage opening portions 42, 43 to open both the first and second passage opening portions 42, 43.

Specifically, two end portions of a guide groove portion 33 in the sliding direction are made narrow so that narrow portions 33a are formed at the two end portions of the guide groove portion 33. Therefore, when the first passage opening portion 42 or the second passage opening portion 43 is closed, the seal portion 21 on the outer peripheral portion of the slide door 12 or the intermediate seal portion 22 press-contacts the outer peripheral portion 3a or the partition portion 11. Accordingly, when the first passage opening portion 42 is closed, sealing performance of the slide door 12 relative to the peripheral portion 3a and the partition portion 11 can be effectively improved. On the other hand, in an intermediate sliding portion where both the first and second passage opening portions 42, 43 are opened and a sealing is unnecessary, a sliding resistance or a sliding noise of the slide door 12 can be effectively reduced.

In the second embodiment, the link portion 23 connected to the link lever 35 is moved in a circular arc shape. Therefore, in an intermediate sliding portion, the seal portion 21, 22 of the slide door 12 is separated from the seal surface of the outer peripheral portion 3b or the partition portion 11 without causing a sliding resistance or a sliding noise. Furthermore, the rotation angle of the rotation shaft 37 is set such that the seal portion 22 press-contacts the partition portion 11 and the seal portion 21 press-contacts the outer peripheral portion 3*b* when the second passage opening portion 43 is closed.

Accordingly, when any one of the first passage opening portion 42 and the second passage opening portion 43 is closed, sealing performance of the slide door 12 relative to the peripheral portions 3*a*, 3*b* and the partition portion 11 can be effectively improved.

Third Embodiment

Figure 6A:
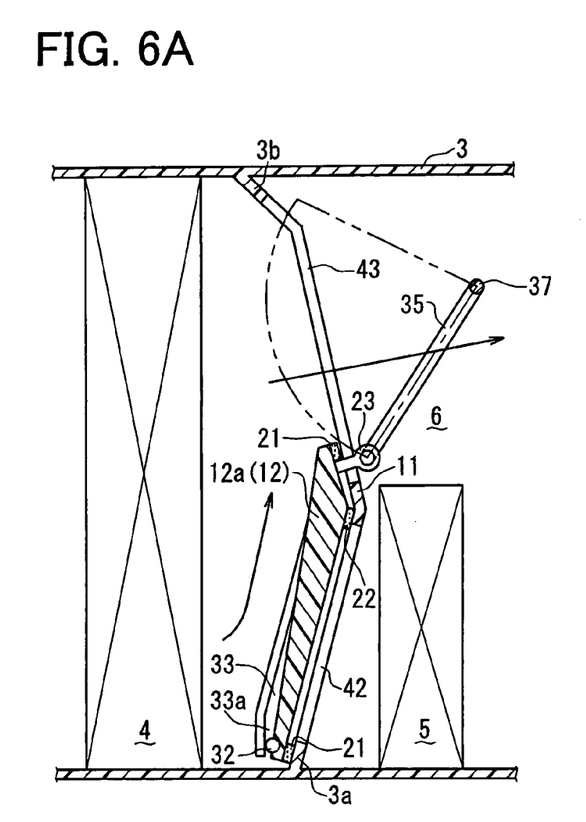

The third embodiment of the present invention will be now described with reference to FIGS. 6A and 6B. In the third embodiment, an air passage switching device of the present invention is typically used for an air mixing portion having an air mixing door for a vehicle air conditioner. That is, a sliding door 12 of the third embodiment is used to have the functions of the air mixing door 7 in FIG. 4. FIG. 6A shows a part of an air conditioning unit in a maximum cold state, and FIG. 6B shows a part of the air conditioning unit in a maximum hot state.

Figure 6B:
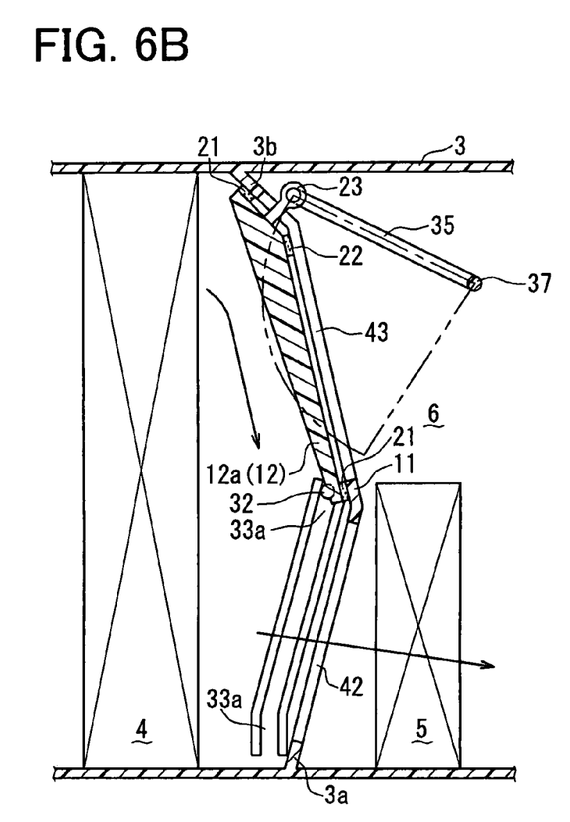

As shown in FIGS. 6A and 6B, the air conditioning unit includes a case 3 for defining an air passage, an evaporator 4 for cooling air blown from a blower unit, and a heater core 5 for heating air from the evaporator 4. The heater core 5 is located to form a cool air bypass passage through which air bypasses the heater core 5. The slide door 12 is used as an air mixing door, and is arranged to open and close an air passage of the heater core 5 and the cool air bypass passage 6. Air from the cool air bypass passage 6 and air from the heater core 5 are mixed in an air mixing portion so that conditioned air can be obtained, and the conditioned air is blown into a passenger compartment of a vehicle through at least one of air outlets.

As shown in FIGS. 6A and 6B, the first passage opening portion 42 communicating with the air passage of the heater core 5 and the second passage opening portion 43 communicating with the bypass passage 6 are formed upstream from the heater core 5 and the cool air bypass passage 6. The slide door 12 adjusts an open ratio between the first passage opening portion 42 and the second passage opening portion 43, so that the temperature of air blown into the passenger compartment is adjusted.

In the third embodiment, a partition portion 11 between the first and second passage opening portions 42, 43 protrudes downstream in an air flow direction, so that the seal surfaces of the first and second passage opening portions 42, 43 of the case 3 are bent approximately in V shape. Accordingly, air can be smoothly guided and introduced downstream from the sliding door 12 by the sliding door 12, thereby reducing air flowing resistance. In the above-described second embodiment, the slide door 12 is arranged so that air is guided by the slide door 12 outside of the V-shaped slide door 12. However, in the third embodiment, the slide door 12 is arranged so that air is guided by the slide door 12 inside of the V-shaped slide door 12. In the third embodiment, because the slide door 12 is formed to have an approximate triangle shape in cross section, the air can be smoothly guided by the surface of the slide door 12.

In this embodiment, the link portion 23 connected to the rotation shaft 37 through the like lever 35 can be made similarly to the structure of the above-described first or second embodiment. Therefore, the advantages described in the above embodiments can be obtained.

Other Embodiments

Although the present invention has been described in connection with some preferred embodiments thereof with reference to the accompanying drawings, it is to be noted that various changes and modifications will become apparent to those skilled in the art.

In the above-described embodiments, the air passage switching device is used for switching two-layer flow passages having a single first passage opening portion 42 and a single second passage opening portion 43. However, the air passage switching device can be used for switching multi-layer flow passages (e.g., three-layer in FIG. 7) having plural opening portions more than two.

Figure 7:
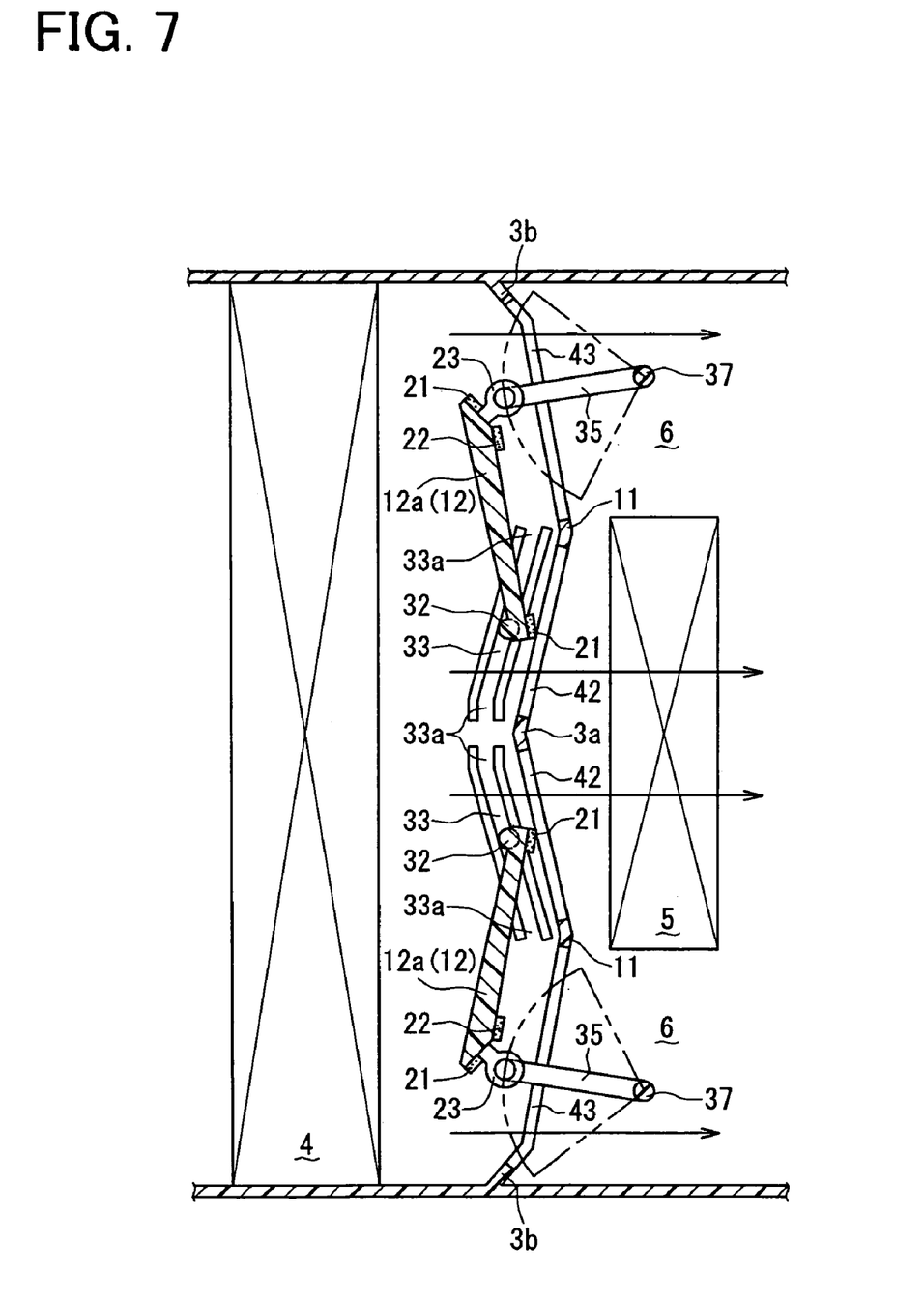
FIG. 7 is a schematic sectional view showing a part of an air passage switching device when the air passage switching device is used for a three-layer flow air mixing portion for a vehicle air conditioner, according to a modification of the present invention.

For example, FIG. 7 is a modification of the air passage switching device of the third embodiment, using two slide doors 12 to switch two first passage opening portions 42 and two second passage opening portions 43. In FIG. 7, components indicated by the same reference numbers as in FIGS. 6A and 6B have the same functions, respectively. Furthermore, in FIG. 7, the two slide doors 12 have the same structure and sizes, however, they may be constructed by different slide doors.

The air passage switching device described in any one of first to third embodiments can be used for a mode switching portion for selectively opening and closing air outlets in a vehicle air conditioner. Furthermore, the passage switching device can be suitably used for switching an air passage having a single passage opening portion.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An air passage switching device comprising:
   a case for defining an air passage, the air passage having adjacent first and second opening portions partitioned from each other by a partition portion;
   a slide door slidable along the first and second opening portions in a sliding direction;
   a guide member, provided in the case, for guiding the slide door to be slidable; and
   a link mechanism for slidably moving the slide door along the guide member, wherein:
   the link mechanism includes a rotation shaft rotatably supported in the case, a link portion provided at one end portion of the slide door in the slide direction, and a link lever connected to the rotation shaft and the link portion;
   the link portion is positioned at a tip end portion of the link lever, and is rotatable around the rotation shaft only within a range of the second opening portion in the sliding direction, among the first and second opening portions; and
   the slide door is provided with a first seal portion for sealing a clearance with outer peripheral portions of the first and second opening portions, and a second seal portion for sealing a clearance with the partition portion.

2. The air passage switching device according to claim 1, wherein the link portion is connected to the slide door at least at one position inside the first seal portion in the sliding direction.

3. The air passage switching device according to claim 1, wherein the link portion is provided at a first end position of the slide door, close to the second opening portion when the slide door fully closes the first opening portion, the air passage switching device further comprising a guide pin provided at a second end portion far from the second opening portion when the slide door fully closes the first opening portion, wherein only the guide pin is engaged with the guide member to be slidable relative to the guide member.

4. The air passage switching device according to claim 3, wherein:

the first opening portion and the second opening portion are arranged on surfaces bent at the partition portion;

the partition portion is bent to correspond to the bent surfaces;

the guide member is arranged only in a range corresponding to the first opening portion in the sliding direction; and the first end portion of the slide door is bent to correspond to the bent partition portion.

5. The air passage switching device according to claim 1, wherein the guide member is provided, such that a press-contacting force of the first and second seal portions of the slide door to the outer peripheral portion of the first and second opening portions and the partition portion is larger when the slide door fully closes one of the first and second opening portions, as compared with a case where both the first and second opening portions are opened by the slide door.

6. The air passage switching device according to claim 1 being used for an inside/outside air switching box of a vehicle air conditioner, wherein:

the first opening portion is used as an outside air introduction port for introducing air outside a passenger compartment into the case;

the second opening portion is used as an inside air introduction port for introducing air inside the passenger compartment into the case; and the partition portion is bent to protrude upstream from the first and second opening portions in an air flow direction.

7. The air passage switching device according to claim 6, wherein the link portion is provided at a first end position of the slide door, close to the second opening portion when the slide door fully closes the first opening portion, the air passage switching device further comprising a guide pin provided at a second end portion far from the second opening portion when the slide door fully closes the first opening portion, wherein only the guide pin is engaged with the guide member to be slidable relative to the guide member.

8. The air passage switching device according to claim 7, wherein:

the first opening portion and the second opening portion are arranged on surfaces bent at the partition portion;

the partition portion is bent to correspond to the bent surfaces;

the guide member is arranged only in a range corresponding to the first opening portion in the sliding direction; and the first end portion of the slide door is bent to correspond to the bent partition portion.

9. The air passage switching device according to claim 1 being used for an air mixing portion of a vehicle air conditioner which includes a cooling unit disposed in the case for cooling air, and a heating unit disposed in the case downstream from the cooling unit for heating air, wherein:

the first opening portion is provided upstream from the heating unit to communicate with a warm air passage of the heating unit;

the second opening portion is provided upstream from the heating unit to communicate with a bypass passage through which air from the cooling unit bypasses the heating unit; and the partition portion is bent to protrude downstream from the first and second opening portions in an air flowing direction.

10. An air conditioner for a vehicle, comprising:

a case for defining an air passage through which air flows into a passenger compartment of the vehicle, the case having adjacent first and second opening portions partitioned from each other by a partition portion, for introducing air inside the passenger compartment and air outside the passenger compartment;

a slide door slidable along the first and second opening portions in a sliding direction to open and close the first and second opening portions;

a guide member, provided in the case, for guiding the slide door to be slidable; and a link mechanism for slidably moving the slide door along the guide member, wherein:

the link mechanism includes a rotation shaft rotatably supported in the case, a link portion provided at one end portion of the slide door in the slide direction, and a link lever connected to the rotation shaft and the link portion;

the link portion is positioned at a tip end portion of the link lever rotatable around the rotation shaft; and the link portion is rotatable around the rotation shaft only within a range of the second opening portion in the sliding direction, among the first and second opening portions.

11. The air conditioner according to claim 10, wherein the slide door is provided with a first seal portion for sealing a clearance with outer peripheral portions of the first and second opening portions, and a second seal portion for sealing a clearance with the partition portion.

12. The air conditioner according to claim 10, wherein the link portion is provided at a first end position of the slide door, close to the second opening portion when the slide door fully closes the first opening portion, the air conditioner further comprising a guide pin provided at a second end portion far from the second opening portion when the slide door fully closes the first opening portion, wherein only the guide pin is engaged with the guide member to be slidable relative to the guide member.

13. The air conditioner according to claim 12, wherein:

the first opening portion and the second opening portion are arranged on surfaces bent at the partition portion;

the partition portion is bent to correspond to the bent surfaces;

the guide member is arranged only in a range corresponding to the first opening portion in the sliding direction; and the first end portion of the slide door is bent to correspond to the bent partition portion.

14. An air conditioner for a vehicle, comprising:

a case for defining an air passage through which air flows into a passenger compartment of the vehicle, the case having adjacent first and second opening portions partitioned from each other by a partition portion in the air passage;

a cooling unit disposed in the case for cooling air;

a heating unit disposed in the case downstream from the cooling unit to heat air, the heating unit being arranged to form a bypass passage through which air from the cooling unit bypasses the heating unit;

a slide door slidable along the first and second opening portions in a sliding direction to open and close the first and second opening portions which communicate with a passage of the heating unit and the bypass passage, respectively, between the cooling unit and the heating unit in an air flowing direction;

a guide member, provided in the case, for guiding the slide door to be slidable; and a link mechanism for slidably moving the slide door along the guide member, wherein:

the link mechanism includes a rotation shaft rotatably supported in the case, a link portion provided at one end portion of the slide door in the slide direction, and a link lever connected to the rotation shaft and the link portion;

the link portion is positioned at a tip end portion of the link lever rotatable around the rotation shaft; and the link portion is rotatable around the rotation shaft only within a range of the second opening portion in the sliding direction, among the first and second opening portions.

15. The air conditioner according to claim 14, wherein the slide door is provided with a first seal portion for sealing a clearance with outer peripheral portions of the first and second opening portions, and a second seal portion for sealing a clearance with the partition portion.

* * * * *